INVENTOR.

Harry L. Price

BY

D. Stephen Baker

ATTORNEY

United States Patent Office 2,821,625

Patented Jan. 28, 1958

2,821,625

MINIATURE SUPER-REGENERATIVE RADIO RECEIVER USING TRANSISTORS

Harry L. Price, Astoria, N. Y.

Application December 20, 1956, Serial No. 629,593

7 Claims. (Cl. 250—20)

The present invention relates to a radio receiver suitable for use in the broadcast frequency range and which utilizes transistors connected in a special super-regenerative circuit whereby both high sensitivity and high selectivity are obtainable in a receiver of vest pocket dimensions.

More specifically, the invention utilizes the space saving and low power consumption features of transistors while obtaining the high selectivity and high amplification features which would be available if vacuum tubes were used.

The super-regenerative circuit employed in the receiver comprises a quench oscillator circuit of the Colpitts type utilizing a transistor, and a regenerative detector circuit utilizing a transistor, the circuits being so connected as to constitute minimum loading upon each other.

Specifically, this is accomplished by deriving the output of the quench oscillator from a tap point of relatively low impedance in the oscillator tank circuit. The low impedance tap point of the tank circuit is connected to the base electrode input circuit of the detector transistor which is also of low impedance. As a result, there is a minimum of loading of the quench oscillator by the regenerative detector and vice versa. Advantageously, the tap point may be formed by using two serially connected capacitors as the capacitative circuit element of the tank circuit in the manner of a Colpitts oscillator. The junction point between the serially connected capacitors serves as the tap point and this type of connection utilizes condenser discharge effects together with the unidirectionally conductive properties of the base-emitter electrode circuit of the transistor to obtain a flattened wave-shape in the regeneration producing direction, thus obtaining a prolonged biasing interval from the quench oscillator sufficient to permit full regenerative build-up in a sharply tuned regenerative detector circuit. As will be recognized, this accomplishment renders the receiver more selective and of higher gain. Further, the signal applied by the quench oscillator to the detector is of asymmetrical wave shape which provides longer periods of regeneration than of quenching action. This permits the regeneration or gain to build up to a maximum extent while the quenching action is more abrupt.

Additional features and advantages of the invention will become apparent upon reading the following specification together with the accompanying drawing forming a part hereof.

Referring to the drawing.

Figure 1:
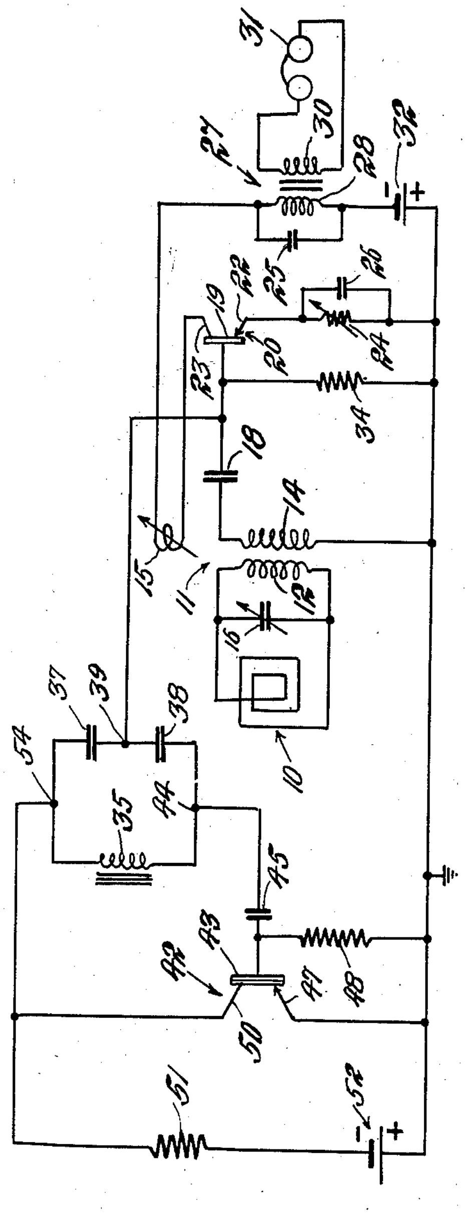
Figure 1 is a schematic circuit diagram of a receiver embodying the invention.

Referring to Figure 1, the receiver comprises an antenna 10 which is connected to a three-winding radio frequency transformer 11. The transformer 11 comprises a primary winding or input winding 12 (which in itself may be the pick-up loop), a secondary winding 14 which is of low impedance compared to the primary winding 11, and a regenerative tickler winding 15, the coupling of the tickler winding 15 being indicated as adjustable.

The loop antenna 10 and transformer 11 are tuned to resonance at the frequency of the desired incoming signal as by means of an adjustable tuning capacitor 16, the loop antenna 10, tuning capacitor 16 and primary winding 14 all being connected in parallel. Of course tuning may be accomplished by a movable ferrite core within coil 12. One side of the secondary winding 14 is grounded and the other side is connected through a blocking capacitor 18 to the base or control electrode 19 of a detector transistor designated generally as 20. As shown, the transistor 20 is of the PNP type, comprising the base electrode 19, an emitter electrode 22 and a collector electrode 23. The emitter electrode 22 is returned to ground through an adjustable volume control resistor 24 which is by-passed by a capacitor 26. The collector electrode 23 of transistor 20 is connected to an audio frequency output transformer 27 through the tickler coil 15 although resistance coupling may be employed if desired.

The audio frequency output transformer 27 comprises a low impedance primary winding 28 and a secondary winding 30. The secondary winding 30 is shown connected to a pair of headphones 31. The primary winding 28 is included in the output circuit of the detector transistor 20, being connected to the collector electrode 23 through the tickler winding 15. The output, or emitter-collector circuit of the transistor 20 is energized by a suitable source of potential shown as a battery 32 the positive terminal of which is grounded. The base electrode of the transistor 20 is connected to ground through a suitable biasing resistor 34.

The quench oscillator portion of the receiver includes an oscillator which is generally of the Colpitts type. The tank circuit of the quench oscillator is of the usual type employed in a Colpitts oscillator and includes an inductor 35 which is tuned by two serially connected capacitors 37 and 38. In a conventional Colpitts oscillator, the junction point 39 between the capacitors 37 and 38 is normally returned to ground. In the present receiver, however, the junction point 39 is connected by a conductor to the base or control electrode 19 of the detector transistor 20 so as to furnish a quench frequency bias voltage therefor.

In its base-emitter circuit, which is returned to ground through the volume control resistor 24, the transistor 20 presents the operating characteristics of a rectifier diode. That is to say, that the resistance from junction point 39 to ground is much less for currents in the forward direction than for potentials in the reverse direction, this asymmetry of resistance being determined by the characteristics of the transistor 20.

The quench oscillator includes a transistor 42 of the PNP type which is similar to the detector transistor 20. The oscillator transistor 42 has a base or control electrode 43 which is connected to ground or a biasing point through resistor 48 and to an external junction point 44 of the tank circuit 35—37—38 through a blocking capacitor 45. The oscillator transistor 42 has an emitter electrode 47 which is returned to ground. The collector electrode 50 is energized through a load resistor 51 by a battery 52 of which the positive terminal is grounded. Of course, batteries 32 and 52 may be the same battery. The collector electrode 50 is also connected to another external junction point 54 of the tank circuit 35—37—38 so that the oscillatory component of the potential on the emitter electrode 50 is opposite in phase with respect to the potential on the base electrode 43. The tank circuit 35—37—38 is preferably tuned to provide a quench frequency of the order of 10 kilocycles in the case of a receiver operating in the 500 to 1500 kilocycle range ordinarily used for commercial broadcast service. The two capacitors 37 and 38 are shown as equal so that the junction point 39 is effectively the center tap point of a reactive circuit element which is one of two oppositely reactive circuit elements in a parallel resonant circuit connected between terminals constituted by the external junction points 44 and 54.

Figure 2:
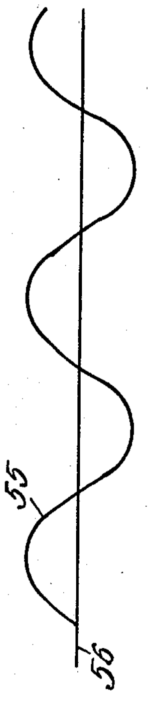
Figure 2 illustrates the wave shapes of the voltage appearing across the tank circuit of the quench oscillator.

The potential between the external junction points 54 and 44 will be of sinusoidal wave shape as indicated by the sine wave 55 shown in Figure 2. The axis of symmetry 56 of the sine wave 55 will have a potential to ground which is determined by the potential on the emitter electrode 50 which is supplied with direct current by the battery 52.

Figure 3:
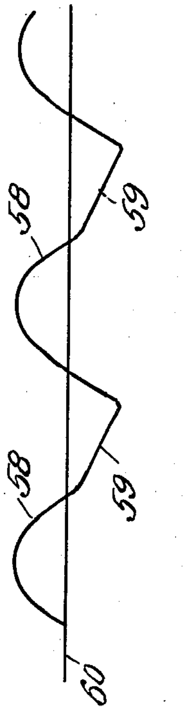
Figure 3 shows the wave shape of the bias voltage which is applied to the base-emitter circuit of the detector transistor.

The potential at the reactance tap point or junction point 39 between the serially connected capacitors 37 and 38 will have an asymmetrical wave shape as shown in Figure 3. The two capacitors 37 and 38 discharge to ground at different times through the low resistance of the base-ground circuit 19—22—24 of the detector transistor 20, this circuit being of high resistance for the positive-going portions 58 of the curve of Figure 3 and of low resistance for the negative-going portions 59 thereof. Although these negative-going discharge currents from the capacitors 37 and 38 occur at different times during each cycle of the quench oscillator, they appear across the resistor 34 in overlapping relationship. As a result, the parts of the negative-going portions 59 of the wave which are of sufficient magnitude to produce regeneration are of extended duration so that the detector transistor 20 is able to build up full regenerative oscillation in the circuit of the sharply tuned transformer 11. The positive-going portions 58 are of relatively short duration in those portions thereof which are of sufficient magnitude to quench the oscillations in the circuit of the tuned transformer 11 during each cycle of the quench oscillator.

The circuit illustrated produces a type of receiver operation such that there is no appreciable loading of the quench oscillator by the detector circuit and the quench oscillator does not load the sharply tuned transformer 11 so as to broaden its tuning. Accordingly, the tuned transformer 11 is operated in a high "Q" circuit so that good selectivity is obtained.

As an illustrative example for the various circuit elements shown in Figure 1, I have found the following to be satisfactory in practice:

| | |
|---|---|
| Transistors **42** and **20** | PNP type, No. CK760. |
| Resistor **51** | 50,000 ohms. |
| Resistor **48** | 10,000 ohms. |
| Capacitors **37**, **38** and **45** | .005 microfarad. |
| Capacitors **18** and **25** | .01 microfarad |
| Transformer **11**: | |
| Primary **12** | 100 turns. |
| Secondary **14** | 5 turns. |
| Resistor **34** | 5,000 ohms. |
| Inductor **35** | Adjusted to resonate the serially connected capacitors **37** and **38** (.0025 mf. for the series combination) at approximately 10 kilocycles. |

From the foregoing it will be seen that I provide a super-regenerative receiver of extreme simplicity and yet which has high sensitivity and good selectivity.

While I have shown what I believe to be the best embodiments of my invention, it will be apparent to those skilled in the art that various changes and modifications may be made therein without departing from the spirit and scope of the invention as defined in the appended claims.

What is claimed is:

1. A super-regenerative receiver, comprising a tuned regenerative detector circuit, said detector circuit including a transistor having base, emitter and collector electrodes, the circuit between said base and emitter electrodes being of low impedance and asymmetrically conductive, a quench oscillator circuit having a frequency of oscillation determined by a tank circuit, said tank circuit consisting of an inductor and two serially connected capacitors, the series combination of said capacitors being connected in multiple with said inductor, and a connection extending between a point in said tank circuit intermediate said capacitors and a point in said detector circuit included in the base-emitter electrode circuit thereof, whereby there is a minimum of loading of said detector circuit by said quench oscillator and vice versa.

2. A receiver according to claim 1, in which said point in said detector circuit is disposed in said base-emitter electrode circuit for applying a quench frequency biasing potential to said base electrode with respect to said emitter electrode, said base-emitter electrode circuit having unidirectionally conductive properties whereby said biasing potential is caused to maintain a prolonged period of regeneration producing biasing potential during each cycle of said quench oscillator circuit.

3. A receiver according to claim 2, in which the voltage applied by said connection to said point in said detector circuit has a wave shape which is substantially sinusoidal in the regeneration quenching portions thereof and is flattened to produce extended periods of regenerative action in the regeneration producing portions thereof.

4. A receiver according to claim 1, wherein said detector circuit, said quench oscillator circuit and said connection between said two points include means for applying a biasing potential to said transistor having a wave shape which is substantially sinusoidal in the regeneration quenching portions thereof and relatively flattened in the regeneration producing portions thereof.

5. A super-regenerative receiver comprising a quench oscillator, said quench oscillator including a reactive circuit element having tap point for deriving a low impedance output therefrom, a detector transistor having base, emitter and collector electrodes, a biasing resistor for returning said base electrode to ground, said tap point of said reactive circuit element being connected to said base electrode and to said biasing resistor, a tuned input transformer connected to said base electrode and said emitter electrode for applying an input signal thereto, and a regenerative tickler coil included in said transformer, said tickler coil being connected in a direct current energizing circuit for said collector electrode.

6. A super-regenerative receiver, comprising in combination a first transistor having base, emitter and collector electrodes, an energizing circuit for said collector electrode including a load resistor, a resonant circuit having two terminals between which an inductive and a capacitative circuit element are both connected in parallel, one of said circuit elements having a tap point intermediate said two terminals, means connecting said collector electrode to one of said terminals, means connecting said base electrode to the other of said terminals, whereby said tuned circuit will oscillate at a quench frequency, a second transistor having base, emitter and collector electrodes, said base electrode of said second transistor being connected to said tap point, a biasing resistor connected to said last-named base electrode, an input transformer connected to said last-named base electrode for applying an input signal thereto, said transformer including a regenerative tickler coil, and an energizing circuit for said last-named collector electrode, said energizing circuit including a signal output circuit and said tickler coil.

7. A super-regenerative receiver comprising a quench oscillator transistor including base, emitter and collector electrodes, an inductor having two terminals, two serially connected capacitors connected to said two inductor terminals to provide a parallel resonant circuit, said capacitors having a junction point therebetween, a source of direct current potential, a load resistor connecting said source to said collector electrode, means connecting said collector electrode to one of said inductor terminals, means connecting the other of said inductor terminals to said base electrode, a first biasing resistor for returning said emitter electrode to ground, a detector transistor having base, emitter and collector electrodes, a tunable input transformer connected to said last-named base electrode, said transformer including a regenerative tickler coil, a return circuit for connecting said last-named emitter electrode to ground, a biasing resistor connected between ground and said last-named base electrode, an energizing circuit for said last-named collector electrode, said energizing circuit including said tickler coil and a signal output circuit, and means connecting said junction point between said capacitors to said last-named base electrode, the circuit to ground through said last-named base and emitter electrodes having unilaterally conductive properties which produce pulses having regeneration causing portions of extended duration permitting regeneration to be built up during each cycle of oscillation of said quench oscillator without appreciable loading the circuit of either of said transistors by the other.

References Cited in the file of this patent

UNITED STATES PATENTS 2,792,494 Suran et al. ------------ May 14, 1957